United States Patent [19]

Aratani et al.

[11] Patent Number: 4,662,926
[45] Date of Patent: May 5, 1987

[54] METHOD OF TOUGHENING GLASS SHEET BY QUENCHING

[75] Inventors: Shinichi Aratani; Tadashi Muramoto, both of Matsusaka, Japan

[73] Assignee: Central Glass Company Limited, Ube, Japan

[21] Appl. No.: 842,723

[22] Filed: Mar. 20, 1986

Related U.S. Application Data

[63] Continuation of Ser. No. 663,201, Oct. 22, 1984, abandoned.

[30] Foreign Application Priority Data

Nov. 16, 1983 [JP] Japan ................................. 58-214173
Sep. 17, 1984 [JP] Japan ................................. 59-192717

[51] Int. Cl.⁴ .......................................... C03B 27/04
[52] U.S. Cl. ...................................... 65/114; 65/115; 65/348; 65/351
[58] Field of Search ................... 65/114, 115, 348, 351

[56] References Cited

FOREIGN PATENT DOCUMENTS

| 138813 | 6/1948 | Australia | 65/114 |
| 820928 | 11/1937 | France | 65/348 |
| 389314 | 5/1932 | United Kingdom . | |
| 397395 | 8/1933 | United Kingdom . | |
| 440467 | 12/1935 | United Kingdom . | |
| 726626 | 3/1955 | United Kingdom | 65/114 |
| 1161815 | 12/1966 | United Kingdom . | |
| 1512163 | 5/1978 | United Kingdom . | |

Primary Examiner—Arthur Kellogg
Attorney, Agent, or Firm—Fleit, Jacobson, Cohn & Price

[57] ABSTRACT

In toughening a glass sheet, e.g. for use as an automobile window, by heating it to a temperature above the strain point and quenching the heated glass sheet by blowing a cooling medium such as compressed air against both sides of the glass sheet from two opposite sets of nozzles, the cooling medium is caused to impinge on each side of the glass sheet in such a pattern that the glass sheet is more efficiently quenched and consequently more highly toughened in a generally circular central region and a plurality of generally annular regions, which are substantially concentrical about the center of the glass sheet and radially spaced from one another, than in the remaining regions. This is effective in preventing the presence of impermissibly elongated particles when the glass sheet is fractured and also in lessening the difference between the maximum and minimum numbers of particles in unit areas of the fractured glass sheet. For example, the desired pattern can be produced by arranging each set of the nozzles on a plurality of concentrical circumferences. Every nozzle may be directed perpendicular to the glass sheet or, rather preferably, tangentially inclined from the direction perpendicular to the glass sheet.

38 Claims, 16 Drawing Figures

METHOD OF TOUGHENING GLASS SHEET BY QUENCHING

This application is a continuation, of application Ser. No. 663,201, filed Oct. 22, 1984 now abandoned.

BACKGROUND OF THE INVENTION

This invention relates to a method of toughening a glass sheet, for example for use as an automobile window, by heating it to a temperature above the strain point and quenching the heated glass sheet by blowing a cooling medium such as compressed air against both sides of the glass sheet.

Such quenching of the glass sheet results in the production of permanent compressive stresses in the surface layers of the glass sheet, with compensating tensile stresses in the center of the glass thickness. When the toughened glass sheet is fractured by localized impact, cracks tend to extend radially from the point of impact and branching of each crack occurs at indefinite intervals until the glass sheet breaks up into small particles of glass.

In many countries there are official regulations specifying the manner of fragmentation of toughened glass sheets for use as windows of motor vehicles. Such regulations commonly require that the fractured glass sheet should not contain dangerously elongated particles. For example, British Standard BS 5282 basically prohibits the presence of particles longer than 60 mm in which the length is not less than four times the width. Besides, BS 5282 specifies that the number of particles included in any 50 mm×50 mm square traced on the glass sheet should be within a limited range and further specifies a maximum permissible area of each particle. In the recent automobile industry there is a trend to reduce the thickness of the glass of windows to thereby aid the reduction of the gross weight of the car. However, for glass sheets of about 3.5 mm or less thickness it becomes difficult to toughen them so as to meet the official regulations, and the difficulty becomes serious for glass sheets of relatively large sizes particularly in respect of the exclusion of elongated particles.

In conventional methods of toughening a glass sheet by quenching, it is usual to use a pair of opposite quenching headers each having a faceplate which is parallel to and slightly wider than the glass sheet and in which a series of quenching nozzles are plugged to jet out compressed air perpendicularly against the surface of the glass sheet. Usually the nozzles on each faceplate are arranged in parallel rows in the pattern of a square lattice or in alternately staggered rows.

British Patent No. 1,512,163, which is concerned with toughening of glass sheets of 2.5-3.5 mm thickness so as to meet the requirements of BS 5282 by using a quenching apparatus of the above described type, proposes to differentially quench the glass sheet so as to produce in the quenched glass sheet a distribution of highly toughened regions, less toughened regions and intermediately toughened regions which are adjacent to one another by oscillating the whole quenching nozzles parallel to the glass sheet either reciprocatively over a distance corresponding to the spacing between the adjacent two nozzles or circularly with an adequate radius. However, this method does not seem to be convenient for industrial practice. Furthermore, the arrangement of the quenching nozzles in the pattern of a square lattice or staggered rows itself does not seem to be quite reasonable when considered from the mechanism of the propagation of cracks at the fracture of the toughened glass sheet. It is known that the cracks tend to run substantially perpendicular to the direction of principal stress in the glass. However, in a glass sheet toughened by using quenching nozzles arranged in a lattice pattern it is likely that principal stresses become too large in some specific regions so that, when the glass sheet is fractured, long and straight cracks that will possibly produce impermissibly elongated particles tend to develop in not small numbers. Besides, the difference between the maximum particle count and the minimum particle count in unit area of the fractured glass sheet is liable to become too large, and it is not rarely that some particles have areas larger than the maximum permissible area. Even though certain compensating measures such as the oscillation of the quenching nozzles described in GB 1,512,163 and controlled transfer of the glass sheet transversely of quenching jets according to separate proposals will be effective to some extent, the intrinsic disadvantage of lattice pattern arrangement of the quenching nozzles remains undissolved. Furthermore, such compensating measures require very careful consideration of various factors.

Japanese patent application primary publication No. 57-129835 (1982) proposes to arrange a set of quenching nozzles on the contours of a number of successive hexagons drawn in a plane parallel to the glass sheet to be toughened. In our view, however, this technique is not fully effective in desirably toughening relatively thin glass sheets.

SUMMARY OF THE INVENTION

It is an object of the present invention to provide an improved method of toughening a glass sheet, which may be for use as an automobile window and may be as thin as about 3 mm, the method having the step of blowing a cooling medium against both sides of a heated glass sheet and being capable of stably producing toughened glass sheets which fully meet the official strength and fragmentation requirements.

This invention provides a method of toughening a glass sheet by the steps of heating the glass sheet to a temperature above the strain point of the glass and quenching the heated glass sheet by blowing a cooling medium against both sides of the glass sheet from a first set of nozzles directed to one side of the glass sheet and a second set of nozzles directed to the opposite side of the glass sheet. The essential feature of the invention resides in that, at the quenching step, the cooling medium is caused to impinge on each side of the glass sheet in such a pattern that the glass sheet is more efficiently quenched and consequently more highly toughened in a generally circular central region and a plurality of generally annular regions, which are substantially concentrical about the center of the glass sheet and radially spaced from one another, than in the remaining regions.

The above defined differential quenching according to the invention can easily be accomplished by arranging each set of the nozzles on a plurality of circumferences which are substantially concentrical and radially spaced from one another and which are drawn in a plane parallel to the glass sheet. Each of the thus arranged nozzles may be oriented substantially perpendicular to the glass sheet, but it is preferred that each of the nozzles is inclined toward a line tangent to the circumference on which that nozzle is arranged at the position of that nozzle such that an angle not smaller than 3° and not greater than 45° is formed between a line perpendicular to the glass sheet and the center axis of each nozzle.

In a glass sheet toughened by this method, glass is relatively highly toughened in a generally circular central region. Around the highly toughened central region, generally annular and less toughened regions and generally annular and relatively highly toughened regions are distributed concentrically and alternately. Accordingly, when a radial line extending from the center of the glass sheet is considered the direction of principal stress in the glass at a point on that line alternately changes as the line intersects every circumferential boundary between a highly toughened region and a less toughened region. Owing to such a manner of toughening, fracture of the glass sheet results in breaking of the glass sheet into particles of adequate sizes including no elongated particles according to the definition of BS 5282, and the number of particles in any 50 mm×50 mm square within a major area of the glass sheet falls within a range specified in BS 5282 or any other nearly equivalent specification. In other words, a glass sheet toughened by the method of the invention has sufficient and, in a macroscopic sense, uniform toughness over substantially the entire area thereof. Such a good toughened glass sheet can be obtained even when the thickness of glass is only about 3 mm or less.

The method according to the invention is applicable to the production of windows of automobiles and other vehicles and also to the production of toughened glass sheets for building uses. When producing a curved and toughened glass sheet, glass sheet is bent by a conventional hot press method prior to the toughening treatment according to the invention, and use is made of a quenching apparatus in which the two sets of quenching nozzles are respectively mounted on convex and concave faceplates which are in conformance with the curved glass surfaces.

In making the present invention it has been taken into consideration that, in general, the probability of formation of elongated particles becomes higher when fracture of a toughened glass sheet begins in its central region, and that usually a central region of a glass sheet is less susceptible of toughening by quenching than the marginal regions. According to the invention, efficient quenching of a central region of the glass sheet can be achieved by arranging the quenching nozzles in the above described manner even though the temperature of the central region is somewhat lower, or higher, than the temperatures in other regions. Therefore, it is possible to equalize the degree of toughening of glass sheet in the central region and in the generally annular regions contained in the marginal regions. It becomes unnecessary to intensely heat a local area of the glass sheet in addition to simple heating of the entire area of the glass sheet in an ordinary furnace, and accordingly the heated glass sheet is free of defects such as elongation in an upper marginal region where the glass sheet is grasped by tongs of a hanger device.

The cooling medium used in the present invention is usually compressed air, but water mist or any other suitable fluid may alternatively be used as in conventional quenching methods. Owing to the improved efficiency of quenching, in the present invention it is possible to lower the pressure of cooling air than in conventional quenching methods of fundamentally the same type.

DESCRIPTION OF THE PREFERRED EMBODIMENTS

In toughening a glass sheet by a method according to the invention, the first step is to heat the glass sheet to a temperature above the strain point, e.g. to 600°-700° C. The heating is accomplished in a conventional furnace in a well known manner.

Figure 1:
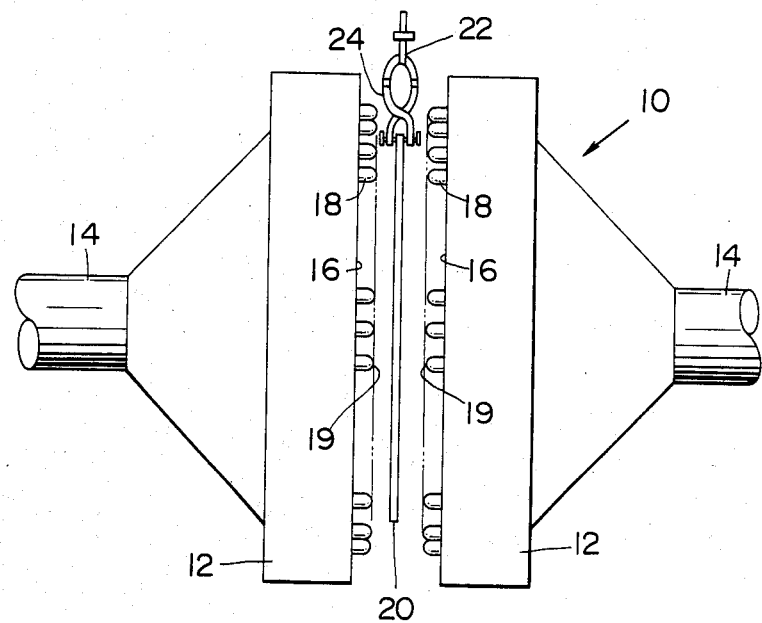
FIG. 1 shows, in a schematic side elevational view, an example of glass sheet quenching apparatus used in the present invention.
Figure 2:
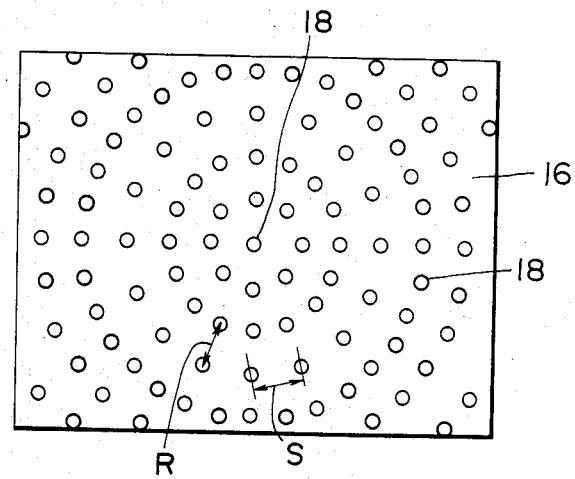
FIG. 2 is a schematic front elevational view of an air blast head in the apparatus of FIG. 1 and shows a preferred pattern of the arrangement of the quenching nozzles.

FIGS. 1 and 2 show a first example of quenching apparatus 10 for use in the present invention. The apparatus 10 has a pair of opposite blast heads 12, and a pipe 14 for the feed of a cooling medium such as compressed air is connected to each blast head 12 on its rear side. Each blast head 12 has a faceplate 16 which is flat in this case but curved in the case of quenching a curved glass sheet, and a number of quenching nozzles 18 are plugged into the faceplate 16 such that the cooling medium supplied through the pipe 14 jets out from every nozzle 18. All the quenching nozzles 18 of each blast head 12 are directed horizontally against the opposite blast head 12, and each nozzle 18 of each blast head 12 is positioned directly opposite to a nozzle 18 of the other blast head 12. A glass sheet 20 to be toughened, which is already heated as mentioned above, is carried into the quenching apparatus 10 by a hanger means 22 which includes tongs 24 and is suspended from a hoist means (not shown). The glass sheet 20 is positioned in the space between the two opposite blast heads 12 at equal distances from the quenching nozzles 18 of the respective blast heads 12. Usually the blast heads 12 can be oscillated parallel to the glass sheet 20 to a limited extent either vertically or laterally, or circularly. Thus, this quenching apparatus 10 is of a well known type, except that the arrangement of the quenching nozzles 18 of each blast head 12 in the surface of the faceplate 16 is as shown in FIG. 2.

As can be seen in FIG. 2, in the front elevational view of the faceplate 16 of each blast head 12 the quenching nozzles 18 are arranged in the pattern of concentrical circles. That is, the nozzles 18 are divided into a plurality of series each of which comprises a plurality of nozzles 18 which are positioned on a circumference at substantially equal circumferential intervals therebetween, and the circumference of each series is at a predetermined radial distance from the circumference of an adjacent series. The center of the concentrical circumferences is approximately at the center of the faceplate 16, and a quenching nozzle 18 is located at this center point. In the quenching operation the glass sheet 20 is usually positioned such that the center nozzles 18 of the two blast heads 12 aim at the center of the glass sheet 20.

The circumferential distance S between two quenching nozzles 18 of the same series and the radial distance R between two series of nozzles 18 are determined with consideration of many factors such as the size and thickness of the glass sheet 20, quenching performance of the apparatus 10 and the maximum permissible length of elongated particles in the fragmentation test of the toughened glass sheet. If the distances S and R are too large it is difficult to sufficiently and uniformly (in a macroscopic sense) toughen the glass sheet 20. In general, it is suitable that neither the circumferential distance S nor the radial distance R is greater than 50 mm. However, if the distances S and R are too short the quenching efficiency becomes low because dissipation of the cooling medium warmed up by contact with the heated glass sheet 20 becomes difficult. It is preferable that the circumferential distance S is 10 to 30 mm and that the radial distance R is 20 to 40 mm. The distance between the nozzle 18 in the center of the faceplate 16 and the innermost circumference is equivalent to the distance R. Also it is preferable that the circumferential distance S is not greater than the radial distance R. Each of the circumferential distance S and the radial distance R is not necessarily constant in every region of the faceplate 16. In regions remote from the center point the circumferential distance S and/or the radial distance R, and particularly the distance S, may be made longer than that in central regions. It is undesirable to vary the distances S and/or R in the reverse manner. In FIG. 2 it is often that a nozzle 18 on each circumference and a nozzle 18 on an adjacent circumference are on the same radial line, but this is not a requisite; rather, it is better to avoid such an arrangement of the nozzles 18.

Figure 3:
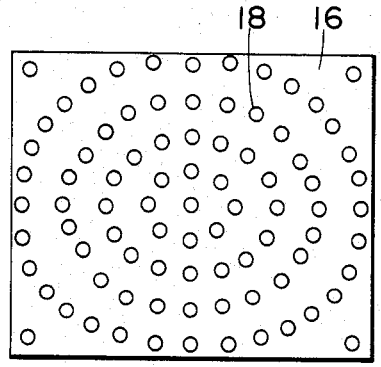
FIGS. 3 and 4 show two different patterns of the arrangement of the quenching nozzles, respectively, for the same apparatus.
Figure 4:
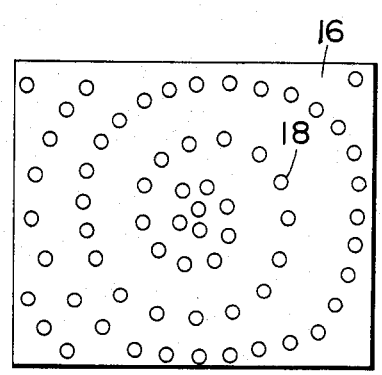

As shown in FIG. 3, the quenching nozzles 18 of the respective blast heads 12 may be arranged in the pattern of concentrical ellipses alternative to the concentrical circular pattern of FIG. 2. Also in this case the distance between two nozzles 18 of the same elliptic series and the distance between two series of nozzles 18 are as described above with reference to FIG. 2. As a still different modification of the pattern of FIG. 2, the quenching nozzles 18 of the respective blast heads 12 may be arranged in a spiral pattern as shown in FIG. 4.

EXAMPLE 1

A 3.0 mm thick and 1200 mm×700 mm wide glass sheet was toughened by using the quenching apparatus shown in FIGS. 1 and 2. In every region of the faceplate 16 of each blast head 12, the circumferential distance S between two quenching nozzles 18 on the same circumference was about 21 mm and the radial distance R between two adjacent circumferences was 30 mm. The effective inner diameter of each nozzle 18 was about 4 mm. The blast heads 12 were adjusted such that the nose 19 of each nozzle 18 of each blast head 12 was at a distance of 30 mm from the surface of the glass sheet 20, which was carried into the quenching apparatus 10 soon after heating in a furnace and had a temperature of 670°–680° C. The glass sheet 20 was quenched by using compressed air as the cooling medium. The air feed pressure was 2500 mmAq and the air feed rate was 560 Nm$^3$/min. During the quenching operation the blast heads 12 were slowly oscillated upward and downward over a vertical distance of about 40 mm. Several samples of the glass sheet were toughened by the same method and under the same conditions except that in some cases the air feed pressure was varied to 2400 mmAq. The samples of the thus toughened glass sheet were subjected to a fragmentation test as described hereinafter.

REFERENCE 1

Figure 10:
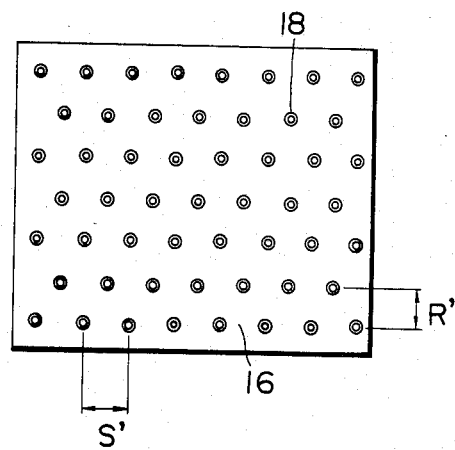
FIG. 10 shows a conventional pattern of the arrangement of the quenching nozzles in a glass sheet quenching apparatus of the type shown in FIG. 1.

In the quenching apparatus 10 of FIG. 1, the blast heads 12 were replaced by conventional ones in which the quenching nozzles 18 were arranged in rows which were alternately staggered as shown in FIG. 10. The distance S' between two nozzles 18 in each row was 25 mm, and the distance R' between two adjacent rows was 24 mm. By using the thus modified apparatus, several samples of the glass sheet mentioned in Example 1 were toughened by the same method and under the same quenching conditions as in Example 1. The obtained samples of toughened glass sheet were subjected to the following test.

FRAGMENTATION TEST

The test procedure was generally in accordance with British Standard BS 5282. The point of impact on each sample of the toughened glass sheet for breaking it was at the approximate center of the rectangular glass sheet ("A" in the following tables) or at a distance of 100 mm from the middle point of a longer side of the glass sheet toward the center ("B" in the following tables). The fragmentation was checked by counting the number of particles included in each of many arbitrarily traced 50 mm×50 mm square areas of the tested glass sheet and the total number of elongated particles which were longer than 60 mm and in which the length was at least four times the width. However, fragmentation was not checked in a strip 20 mm wide all round the edge of the glass sheet, and within a radius of 75 mm around the point of impact. The results were as shown in Table 1.

TABLE 1

| Sample No. | Air Pressure (mmAq) | Point of Impact | Particle Count (in 50 mm × 50 mm square) Max. | Min. | Number of Elongated Particles |
|---|---|---|---|---|---|
| Example 1 | | | | | |

TABLE 1-continued

| Sample No. | Air Pressure (mmAq) | Point of Impact | Particle Count (in 50 mm × 50 mm square) Max. | Particle Count (in 50 mm × 50 mm square) Min. | Number of Elongated Particles |
|---|---|---|---|---|---|
| No. 1 | 2500 | A | 260 | 71 | 0 |
| No. 2 | 2400 | A | 251 | 66 | 0 |
| No. 3 | 2500 | B | 183 | 81 | 0 |
| Reference 1 | | | | | |
| No. 1 | 2500 | A | 241 | 56 | 8 |
| No. 2 | 2600 | A | 253 | 59 | 7 |
| No. 3 | 2500 | B | 169 | 64 | 1 |

The fragmentation of the samples produced in Example 1 and Reference 1 was further tested by the test methods specified in Japanese Industrial Standard JIS R 3212 and in the European Economic Community (EEC) Standard. The results of these supplementary tests were nearly equivalent to the test results shown in Table 1.

Figure 6:
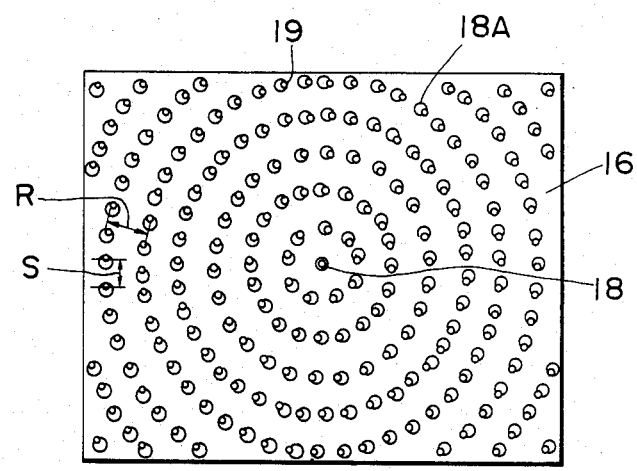
FIG. 6 is a schematic front elevational view of an air blast head in the apparatus of FIG. 5 and shows a preferred pattern of the arrangement of the quenching nozzles.
Figure 5:
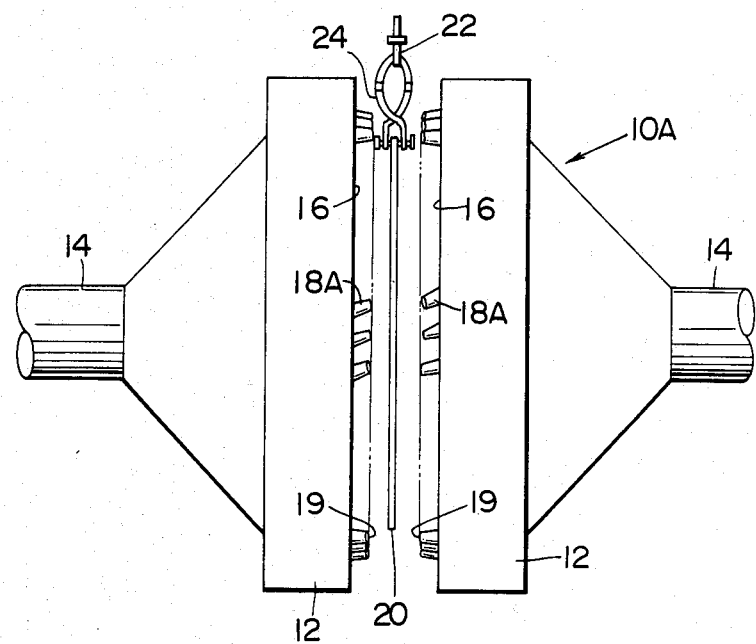
FIG. 5 shows, in a schematic side elevational view, another example of glass sheet quenching apparatus used in the present invention.
Figure 7:
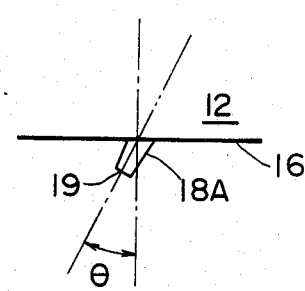
FIG. 7 shows one of the quenching nozzles in FIG. 6 in a plan view.

FIGS. 5-7 show a preferred modification of the quenching apparatus 10 of FIGS. 1 and 2. The quenching apparatus 10A shown in FIG. 5 is similar to the apparatus 10 of FIG. 1 in the fundamental construction and also in the concentrical circular arrangement of the quenching nozzles 18A. As the unique feature of this apparatus 10A, every quenching nozzle 18A of each blast head 12 except the one nozzle 18 in the center of the faceplate 16 is inclined from a line perpendicular to the faceplate 16 toward a line that is tangent to the circumference on which the nozzle 18A is positioned and intersects the center axis of that nozzle 18A. For every nozzle 18A except the center nozzle 18, the angle $\theta$ between the perpendicular to the faceplate 16 and the center axis of nozzle 18A is substantially constant. Therefore, the respective nozzles 18A on each circumference project in different and regularly changing directions. By inclining the quenching nozzles 18A in this manner, it becomes easier to differentially quench the glass sheet such that annular regions of relatively highly toughened glass and annular regions of less toughened glass are alternately and concentrically distributed in the quenched glass sheet. Accordingly it becomes possible to lower the air feed pressure in the quenching operation. Also it becomes possible to lessen the differences between the relatively large principal stresses in the highly toughened regions and the relatively small principal stresses in the less toughened regions, and accordingly it is ensured that the glass sheet is toughened without producing irregular regions in which peculiar stresses are acting and which may become a cause of elongated particles upon fracture of the glass sheet.

In the apparatus 10A of FIG. 5 for use in the present invention, the angle $\theta$ of inclination of each quenching nozzle 18A is not smaller than 3° and not greater than 45°, and preferably is in the range from 5° to 25°. If the angle $\theta$ is smaller than 3° it is difficult to obtain the expected effects of inclining the nozzles 18A. On the other hand, when the angle $\theta$ is greater than 45° the quenching efficiency of the apparatus 10A becomes very low. When the angle $\theta$ is set at a suitable value within the range from 5° to 25°, the quenching of a large number of glass sheets can be accomplished with invariably good results. In the two blast heads 12 in the opposite arrangement, it is preferable that the nozzles 18A of one blast head are symmetric to the nozzles 18A of the other blast head 12 in the directions of inclination.

Figure 8:
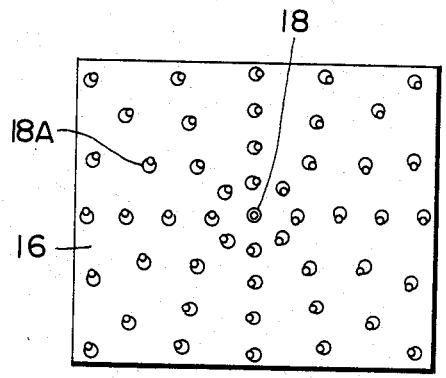
FIGS. 8 and 9 show two different patterns of the arrangement of the quenching nozzles, respectively, for the apparatus of FIG. 5.
Figure 9:
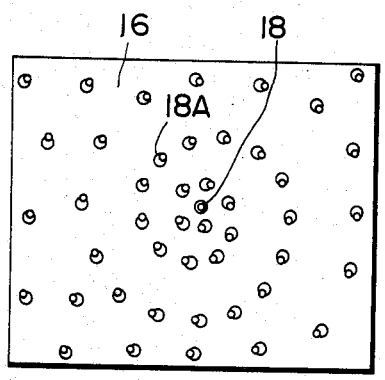

The previous explanation as to the spacings between the quenching nozzles 18 in FIG. 2 holds good for the inclined nozzles 18A in FIG. 6 also. That is, it is preferable that the circumferential distance S between two nozzles 18A on each circumference is 10 to 30 mm and that the radial distance R between two adjacent circumferences (as well as the distance of the innermost circumference from the center nozzle 18) is 20 to 40 mm. The inclined nozzles 18A of the respective blast heads 12 may be arranged in the pattern of concentrical ellipses as shown in FIG. 8 alternative to the concentrical circular pattern of FIG. 6. It is also possible to arrange the nozzles 18A of the respective blast heads 12 in a spiral pattern as shown in FIG. 9.

EXAMPLE 2

By using the quenching apparatus 10A of FIGS. 5-7, 3.0 mm thick and 1200 mm × 700 mm rectangular glass sheets 20 were toughened. Also in this case, the circumferential distance S between two nozzles 18A on the same circumference was about 21 mm and the radial distance R between two adjacent circumferences was 30 mm. The effective inner diameter of each nozzle 18A was about 4 mm. Every nozzle 18A was inclined toward the tangential line so as to form an angle $\theta$ of 5° with the line perpendicular to the faceplate 16. The nose 19 of each nozzle 18A of each blast head 12 was at a distance of 30 mm from the surface of the glass sheet 20, which had a temperature of 670°-680° C. The quenching operation was performed in the same manner as in Example 1 except that for some samples the air feed pressure was lowered to 2300 mmAq or to 2100 mmAq.

The glass sheet samples toughened in Example 2 were subjected to the fragmentation test described hereinbefore. The results are shown in Table 2.

TABLE 2

| Sample No. | Air Pressure (mmAq) | Point of Impact | Particle Count (in 50 mm × 50 mm square) Max. | Particle Count (in 50 mm × 50 mm square) Min. | Number of Elongated Particles |
|---|---|---|---|---|---|
| Example 2 | | | | | |
| No. 1 | 2500 | A | 271 | 87 | 0 |
| No. 2 | 2300 | A | 254 | 80 | 0 |
| No. 3 | 2100 | A | 239 | 68 | 0 |
| No. 4 | 2500 | B | 220 | 101 | 0 |

The fragmentation of the samples produced in Example 2 was further tested by the test methods specified in JIS R 3212 and in the EEC standard. The results of these supplementary tests were nearly equivalent to the test results shown in Table 2.

Figure 11:
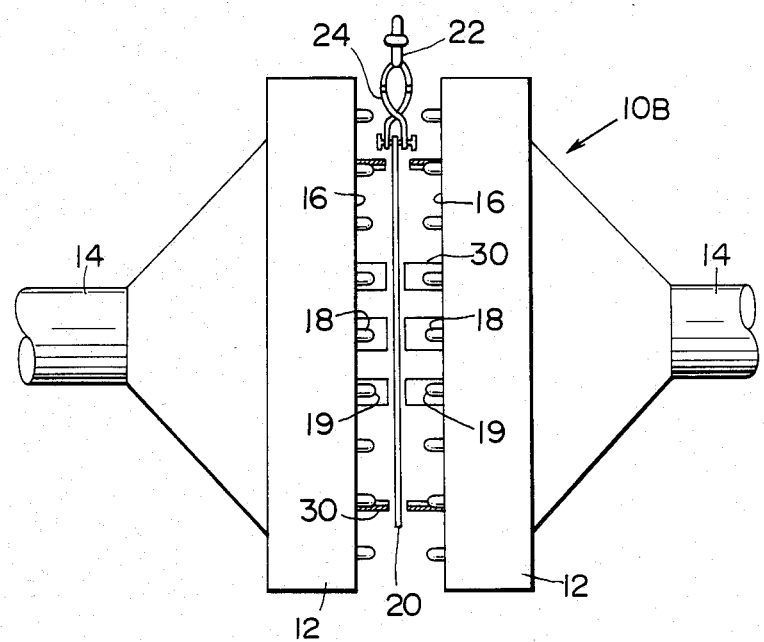
FIG. 11 shows, in a schematic side elevational view, another example of glass sheet quenching apparatus used in the present invention.
Figure 12:
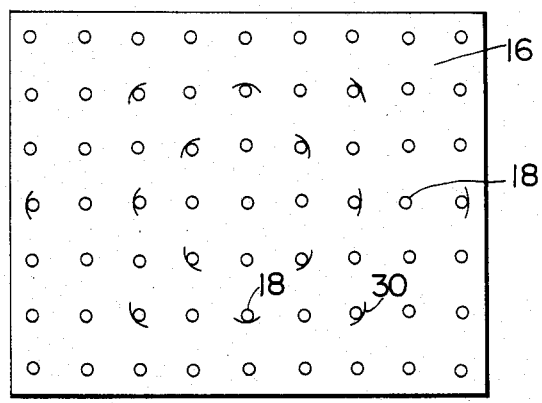
FIG. 12 is a schematic front elevational view of an air blast head in the apparatus of FIG. 11.
Figure 14:
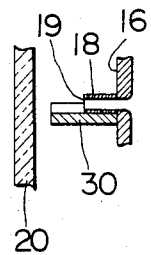
FIG. 14 is a sectional view taken along the line 14—14 in FIG. 13.
Figure 13:
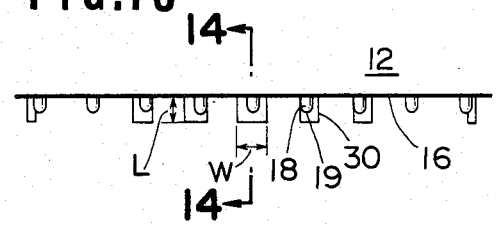
FIG. 13 shows deflector plates attached to some of the quenching nozzles in FIG. 12 in an explanatory plan view.

FIGS. 11-14 show another example of quenching apparatus that can be used in the present invention. The quenching apparatus 10B shown in FIG. 11 is similar to the apparatus 10 of FIG. 1 in the fundamental construction. In this apparatus 10B, however, the quenching nozzles 18 of each blast head 12 are arranged in the pattern of a regular lattice as shown in FIG. 12. All the nozzles 18 of each blast head 12 are directed horizontally against the opposite blast head 12. As an important difference from a conventional quenching apparatus in which the quenching nozzles are arranged in the same lattice pattern, a plurality of deflector plates 30 are fixed to the faceplate 16 of each blast head 12 so as to protrude toward the opposite blast head 12. Each deflector plate 30 is curved so as to become a small part of a hollow cylinder having a relatively large diameter. As can be seen in FIG. 12, in the front elevational view of the faceplate 16 of each blast head 12 the deflector plates 30 are arranged in the pattern of concentrical circles. In other words, the deflector plates 30 in FIG. 12 are divided into a plurality of series each of which comprises a plurality of deflector plates 30 which are positioned on a circumference at substantially equal circumferential intervals therebetween, and the circumference of each series is at a predetermined radial distance from the circumference of an adjacent series. The center of the concentrical circumferences is at the approximate center of the faceplate 16. Each deflector plate 30 is oriented such that the cooling medium jetted out of the nozzle (or nozzles) 18 is deflected semicircularly or arcuately with respect to the center of the faceplate 16, and also toward the center of the faceplate 16. FIGS. 11-14 show that each deflector plate 30 is closely adjacent to one of the nozzles 18. This is preferable but is not a requisite.

The deflector plates 30 in FIGS. 11-14 cause generally circular deflection of the cooling medium jetted out of the nozzles 18 and, therefore, have the effect of differentially quenching the glass sheet 20 such that generally annular regions of relatively highly toughened glass and generally annular regions of less toughened glass are alternately and concentrically distributed in the quenched glass sheet. Compared with the concentrical circular arrangement of the nozzles 18 in the apparatus 10 of FIGS. 1 and 2, the provision of the deflector plates 30 to the blast heads 12 having the nozzles 18 in a simple lattice pattern may be more convenient for industrial practice. The size of each deflector plate 30 and the spacings between the deflector plates 30 are adequately determined with consideration of the factors described hereinbefore with respect to the spacings between the circularly arranged nozzles 18 in FIG. 2. Usually a suitable size of each deflector plate 30 is about 50 mm × 50 mm. It is preferable that every deflector plate 30 is sufficiently large in its length L so that the free end of the deflector plate 30 may come very close to the surface of the glass sheet 20. At least, the length L of every deflector plate 30 should be greater than the length of the nozzle 18 protruding from the surface of the faceplate 16.

Figure 15:
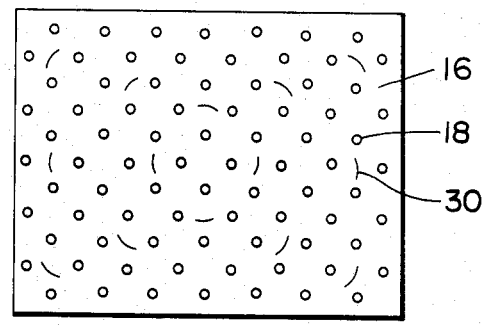
FIGS. 15 and 16 respectively show two different modifications of the arrangement of the deflector plates in FIG. 12.
Figure 16:
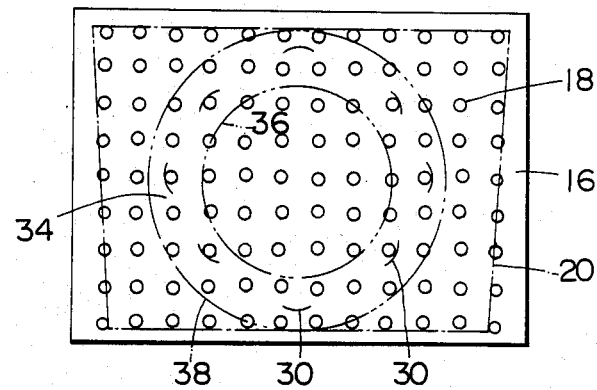

Alternative to the concentrical circular pattern shown in FIG. 12, the deflector plates 30 may be arranged in the pattern of concentrical ellipses or even in a spiral pattern. As shown in FIG. 15, it is also possible to locate each deflector plate 30 between two nozzles 18 or in the middle of a square area defined by four nozzles 18. Where it suffices that the deflector plates 30 make an effective contribution to a decrease in the number of elongated particles of glass at the time of fracture of the toughened glass sheet, it is possible to provide the deflector plates 30 only in a specific area of the faceplate 16 of the blast head 12. FIG. 16 shows an example of such cases, assuming that the center of the glass sheet 20 to be quenched is brought into approximate agreement with the center of the faceplate 16. In this case the deflector plates 30 are provided only in an annular area 34 of the faceplate 16 defined between two concentrical circumferences 36 and 38 drawn about the center of the faceplate 16. It is suitable that the radial width of the annular area 34 is about 200-300 mm. For example, the number of the deflector plates 30 may be a quarter to a half of the number of the nozzles 18 contained in the annular area 34.

EXAMPLE 3

By using the quenching apparatus 10B of FIGS. 11-14, 3.0 mm thick and 1200 mm × 700 mm rectangular glass sheets 20 were toughened generally in the same manner as in Example 1. The distance between two adjacent nozzles 18 was 30 mm either vertically or horizontally. The effective inner diameter of each nozzle 18 was about 4 mm. The nose 19 of each nozzle 18 of each blast head 12 was at a distance of 30 mm from the surface of the glass sheet 20, which had a temperature of 670°-680° C. Each deflector plate 30 was 50 mm in width W, and the length L was variably adjusted such that the distance of the free end of each deflector plate 30 from the glass surface was 5 mm in one case and 30 mm in another case. The quenching operation was performed in the same manner as in Example 1 by setting the air feed pressure at 2500 mmAq in every case. The glass sheet samples toughened in Example 3 were subjected to the fragmentation test described hereinbefore. The results are shown in Table 3.

REFERENCE 2

Use was made of a quenching apparatus which was generally similar to the apparatus 10B used in Example 3 but did not comprise the deflector plates 30 shown in FIGS. 11-14. Except this modification, quenching of the glass sheets was performed in accordance with Example 3. The obtained samples of toughened glass sheet were subjected to the aforementioned fragmentation test. The results are shown in Table 3.

TABLE 3

| Sample No. | Distance of Deflector Plates from Glass Surface | Point of Impact | Particle Count (in 50 mm × 50 mm square) Max. | Min. | Number of Elongated Particles |
|---|---|---|---|---|---|
| Example 3 | | | | | |
| No. 1 | 5 mm | A | 242 | 61 | 0 |
| No. 2 | 30 mm | A | 259 | 61 | 1 |
| No. 3 | 5 mm | B | 159 | 63 | 0 |
| No. 4 | 30 mm | B | 163 | 65 | 0 |
| Reference 2 | | | | | |
| No. 1 | no deflectors | A | 255 | 50 | 7 |
| No. 2 | " | A | 235 | 48 | 5 |
| No. 3 | " | A | 243 | 51 | 6 |
| No. 4 | " | B | 170 | 61 | 1 |

What is claimed is:

1. A method of toughening a glass sheet, said method comprising:
heating the glass sheet to a temperature above the strain point of the glass,
quenching the heated glass sheet by blowing a cooling medium against both sides of the glass sheet from a first set of nozzles located on a first blast head and directed to one side of the glass sheet and a second set of nozzles located on a second blast head and directed to the opposite side of the glass sheet,
each set of said nozzles on the respective blast heads being arranged on a plurality of circumferences which are substantially concentrical and radially spaced from one another and which are located in a plane parallel to and close to the glass sheet, the radal distance between adjacent two of said circumferences being in the range from 20 to 40 mm and the circumferential distance between adjacent two nozzles on each circumference being in the range from 10 to 30 mm; and linearly oscillating said first and second blast heads, while said cooling medium is blown against both sides of the glass sheet, such that each set of said nozzles linearly oscillate in a plane parallel to the glass sheet over a distance not shorter than said radial distance.

2. A method according to claim 1 wherein each of said nozzles is oriented substantially perpendicular to the glass sheet.

3. A method according to claim 1, wherein each of said nozzles is inclined toward a line tangent to the circumference on which each of said each nozzles are arranged such that an angle not smaller than 3° and not greater than 45° is formed between a line perpendicular to the glass sheet and the center axis of each of said nozzles.

4. A method according to claim 3, wherein said angle is in the range from 5° to 25°.

5. A method according to claim 3, wherein said nozzles on each circumference are all inclined toward the same circumferential direction.

6. A method according to claim 1, wherein said cooling medium is pressurized air.

7. A method according to claim 1, wherein said cooling medium is water mist.

8. A method of toughening a glass sheet as claimed in claim 1, wherein said circumferential distance is less than said radial distance.

9. A method of toughening a glass sheet as claimed in claim 1, wherein upon breaking of said quenched glass sheet, elongated particles which are produced having a length greater than 60 mm, are greater in length than four times their width.

10. A method of toughening a glass sheet, said method comprising:

heating of the glass sheet to a temperture above the strain point of the glass, quenching the heated glass sheet by blowing a cooling medium against both sides of the glass sheet from a first set of nozzles located on a first blast head and directed to one side of the glass sheet and a second set of nozzles located on a second blast head and directed to the opposite side of the glass sheet, each set of said nozzles on the respective blast heads being arranged on a plurality of ellipses which are substantially symmetrical and concentrical and radially spaced from one another and which are located in a plane parallel to and close to the glass sheet, the radial distance between adjacent two of said ellipses being in the range from 20 to 40 mm and the circumferential distance between adjacent two nozzles on each ellipse being in the range from 10 to 30 mm; and linearly oscillating said first and second blast heads, while said cooling medium is blown against both sides of the glass sheet, such that each set of said nozzles linearly oscillate in a plane parallel to the glass sheet over a distance not shorter than said radial distance.

11. A method according to claim 10, wherein each of said nozzles is oriented substantially perpendicular to the glass sheet.

12. A method according to claim 10, wherein each of said nozzles is inclined toward a line tangent to the circumference on which each of said nozzles are arranged such that an angle not smaller than 3° and not greater than 45° is formed between a line perpendicular to the glass sheet and the center axis of each of said nozzles.

13. A method according to claim 12, wherein said angle is in the range from 5° to 25°.

14. A method according to claim 12, wherein said nozzles on each circumference are all inclined toward the same circumferential direction.

15. A method according to claim 10, wherein said cooling medium is pressurized air.

16. A method according to claim 10, wherein said cooling medium is water mist.

17. A method of toughening a glass sheet as claimed in claim 10, wherein said circumferential distance is less than said radial distance.

18. A method of toughening a glass sheet as claimed in claim 10, wherein upon breaking of said quenched glass sheet, elongated particles which are produced having a length greater than 60 mm, are greater in length than four times their width.

19. A method of toughening a glass sheet, said method comprising:

heating the glass sheet to a temperature above the strain point of the glass, quenching the heated glass sheet by blowing a cooling medium against both sides of the glass sheet from a first set of nozzles located on a first blast head and directed to one side of the glass sheet and a second set of nozzles located on a second blast head and directed to the opposite side of the glass sheet, each set of said nozzles on the respective blast heads being arranged on a spiral line which is located in a plane parallel to and close to the glass sheet and around a center point which corresponds to the approximate center of the glass sheet, the radial distance between adjacent two generally circularly curved segments of said spiral line being in the range from 20 to 40 mm and the circumferential distance between two adjacent nozzles being in the from 10 to 30 mm; and linearly oscillating said first and second blast heads, while said cooling medium is blown against both sides of the glass sheet, such that each set of said nozzles linearly oscillate in a plane parallel to the glass sheet over a distance not shorter than said radial distance.

20. A method according to claim 19, wherein each of said nozzles is oriented substantially perpendicular to the glass sheet.

21. A method according to claim 19, wherein each of said nozzles is inclined toward a line tangent to the circumference on which each of said nozzles are arranged such that an angle not smaller than 3° and not greater than 45° is formed between a line perpendicular to the glass sheet and the center axis of each of said nozzles.

22. A method according to claim 21, wherein said angle is in range from 5° to 25°.

23. A method according to claim 21, wherein said nozzles on each circumference are all inclined toward the same circumferential direction.

24. A method according to claim 19, wherein said cooling medium is pressurized air.

25. A method according to claim 19, wherein said cooling medium is water mist.

26. A method of toughening a glass sheet as claimed in claim 19, wherein said circumferential distance is less than said radial distance.

27. A method of toughening a glass sheet as claimed in claim 19, wherein upon breaking of said quenched glass sheet, elongated particles which are produced having a length greater than 60 mm, are greater in length than four times their width.

28. A method of toughening a glass sheet, said method comprising:

heating the glass sheet to a temperature above the strain point of the glass, quenching the heated glass sheet by blowing a cooling medium against both sides of the glass sheet from a first set of nozzles directed to one side of the glass sheet and a second set of nozzles directed to the opposite side of the glass sheets said cooling medium being caused to impinge on each side of the glass sheet in such a pattern that the glass sheet is more efficiently quenched and consequently more highly toughened in a generally circular central region and a plurality of generally annular regions, which are substantially concentrical about the center of the glass sheet and radially spaced from one another, than in the remaining regions, said pattern of impingement of said cooling medium on the glass sheet being produced by arranging each set of said nozzles in parallel rows and orienting each of said nozzles substantially perpendicular to the glass sheet, and disposing a plurality of curved deflector plates at selected locations between said nozzles of each set such that said deflector plates are arranged on a plurality of circumferences which are substantially concentrical about a center point which corresponds to the center of the glass sheet and radially spaced from one another and which are drawn in a plane parallel to the glass sheet.

29. A method according to claim 28, wherein each of said deflector plates is oriented such that said cooling medium jetted out of a nearly one of said nozzles is oriented circumferentially of the circumference on which said each deflector plate is arranged and also toward the center of the glass sheet.

30. A method according to claim 28, wherein said cooling medium is pressurized air.

31. A method according to claim 28, wherein said cooling medium is water mist.

32. A method according to claim 28, wherein each of said nozzles is oriented substantially perpendicular to the glass sheet.

33. a method according to claim 28, wherein each of said nozzles is inclined toward a line tagent to the circumference on which said nozzle is arranged at the position of said each nozzle such that an angle not smaller than 3° and not greater than 45° is formed between a line perpendicular to the glass sheet and the center axis of said each nozzle.

34. A method according to claim 33, wherein said angle is in the range from 5° to 25°.

35. A method according to claim 33, wherein said nozzles on each circumference are all inclined toward the same circumferential direction.

36. A method according to claim 28, wherein the circumferential distance between adjacent two deflector plates on each circumference is not greater than 50 mm and the radial distance between adjacent two of said circumferences is not greater than 50 mm.

37. A method according to claim 36, wherein said circumferential distance is in the range from 10 to 30 mm and said radial distance is in the range 20 to 40 mm.

38. A method according to claim 37, further comprising the step of linearly oscillating said first and second sets of nozzels, while said cooling medium is blown against both sides of the glass sheet, such that each set of nozzles linearly oscillate in a plane parallel to the glass sheet over a distance not shorter than said radial distance.

* * * * *